US012318971B2

(12) United States Patent
Chu et al.

(10) Patent No.: US 12,318,971 B2
(45) Date of Patent: Jun. 3, 2025

(54) MOLD FOR PARTIALLY SHORTENING CIRCUMFERENCE OF TUBE BILLET AND USING METHOD OF MOLD

(71) Applicants: Guannan Chu, Weihai (CN); Harbin Institute of Technology, Weihai, Weihai (CN)

(72) Inventors: Guannan Chu, Weihai (CN); Lei Sun, Weihai (CN); Anying Yuan, Weihai (CN)

(73) Assignees: CHU, GUANNAN, Weihai (CN); HARBIN INSTITUTE OF TECHNOLOGY, WEIHAI, Weihai (CN)

( * ) Notice: Subject to any disclaimer, the term of this patent is extended or adjusted under 35 U.S.C. 154(b) by 482 days.

(21) Appl. No.: 17/841,746

(22) Filed: Jun. 16, 2022

(65) Prior Publication Data

US 2022/0402176 A1    Dec. 22, 2022

(30) Foreign Application Priority Data

Jun. 16, 2021    (CN) .......................... 202110664990.9

(51) Int. Cl.
| | | |
|---|---|---|
| B29C 43/36 | (2006.01) | |
| B29C 43/02 | (2006.01) | |
| B29C 48/03 | (2019.01) | |
| B29C 48/32 | (2019.01) | |
| B29L 23/00 | (2006.01) | |

(52) U.S. Cl.
CPC ............ *B29C 43/36* (2013.01); *B29C 43/027* (2013.01); *B29C 48/131* (2019.02); *B29C 48/32* (2019.02); *B29C 2043/028* (2013.01); *B29C 2043/3665* (2013.01); *B29L 2023/22* (2013.01)

(58) Field of Classification Search
None
See application file for complete search history.

(56) References Cited

U.S. PATENT DOCUMENTS 4,422,839 A * 12/1983 Przytulla ................. B29C 48/09
425/465
2019/0389162 A1* 12/2019 Welker .................... B29C 61/04

FOREIGN PATENT DOCUMENTS

CN             112519127 A  *  3/2021  ............. B29C 45/26

OTHER PUBLICATIONS

Chen CN112519127A English Translation 2020 (Year: 2020).*

* cited by examiner

*Primary Examiner* — Jacob T Minskey
*Assistant Examiner* — Adrien J Bernard
(74) *Attorney, Agent, or Firm* — Tarolli, Sundheim, Covell & Tummino LLP (57) ABSTRACT

Disclosed is a mold for partially shortening the circumference of a tube billet and a using method of the mold. The mold comprises an upper mold, a lower mold and a mold core used for being inserted into a tube cavity of the tube billet, wherein the upper mold is provided with an upper mold cavity, the lower mold is provided with a lower mold cavity, and the upper mold cavity and the lower mold cavity are matched to form a mold cavity. After the mold core is placed in the mold cavity, a tube billet deformation cavity is formed in the mold cavity; and the upper mold cavity and/or the lower mold cavity are/is in the shape of a flaring, the two sides of the flaring are arc-shaped, and included angles are formed between the two sides of the flaring and the moving direction of a movable mold.

12 Claims, 7 Drawing Sheets

MOLD FOR PARTIALLY SHORTENING CIRCUMFERENCE OF TUBE BILLET AND USING METHOD OF MOLD

CROSS REFERENCE TO RELATED APPLICATION

This patent application claims the benefit and priority of Chinese Patent Application No. 202110664990.9, filed on Jun. 16, 2021, the disclosure of which is incorporated by reference herein in its entirety as part of the present application.

TECHNICAL FIELD

The present disclosure relates to a mold for partially shortening the circumference of a tube billet and a using method of the mold, and belongs to the fields of tube billet processing technology and special equipment.

BACKGROUND ART

The tube fitting capable of fully utilizing the rigidity of materials has better bending resistance and safety performance, and is widely applied to mechanical structures. During actual bearing, stress conditions of all parts of a part are different, and section circumferences required by common tube fittings at different positions are different. Typically, at the position where the flexural modulus is large, the designed cross-sectional circumference is large, and at the position where the flexural modulus is small, the cross-sectional circumference is small, so that the part preferably has a different cross-sectional circumference or shape along the axis. At present, various technologies can realize the change of the circumference of the cross section of the part, such as tube shrinkage, internal high-pressure forming, pressurized upsetting and the like. However, the problems of low efficiency, need of special equipment and the like exist in the prior art, and the manufacturing cost is high. Especially for the pressurizing upsetting process, the effectiveness of the process can be guaranteed only by continuously pressurizing the tube fitting, so that the requirement for sealing performance is high, and corresponding pressurizing equipment is required. In order to solve the problems of low efficiency, high cost and the like in the existing manufacturing process due to the fact that the circumference of the tube billet is changed, particularly the circumference is partially reduced, those skilled in the art actively research how to improve the efficiency and reduce the cost.

SUMMARY

Aiming at the problems in the prior art, the present disclosure provides a mold for partially shortening the circumference of a tube billet and a using method of the mold.

Through the following technical scheme, the above technical problems are solved. The mold for partially shortening the circumference of a tube billet comprises an upper mold, a lower mold and a mold core used for being inserted into a tube cavity of the tube billet. The upper mold is provided with an upper mold cavity, the lower mold is provided with a lower mold cavity, and the upper mold cavity and the lower mold cavity are matched to form a mold cavity. The mold is characterized in that after the mold core is placed in the mold cavity, a tube billet deformation cavity is formed in the mold cavity; and the upper mold cavity and/or the lower mold cavity are/is in the shape of a flaring, the two sides of the flaring are arc-shaped, and included angles are formed between the two sides of the flaring and the moving direction of a movable mold.

The technical scheme has the advantages that by improving the flaring, the two sides of the flaring are designed to be arc-shaped, and the side wall of the mold cavity has a bent radian. During extrusion, the flow guide effect is achieved on the flowing direction of tube billet deformation. Namely, the shape of the flaring side wall is improved, the stress state of the tube billet during extrusion is adjusted, and control over the flowing direction of deformation is achieved. According to the designed mold cavity, a gap between the outer wall of the mold core and the wall of the mold cavity is bent. When the mold extrudes the tube billet, the top of the tube billet is firstly contacted with the mold and is pressed to deform towards the two sides. In the process of deformation of the two sides, the opening end is stressed, and the deformed part of the tube billet deforms towards the bent gap in the mold cavity; and finally, the mold cavity can be filled with the deformed part of the tube billet.

In order to better solve the technical problem to be solved by the present disclosure, on the basis of the above technical scheme, the following improvements can be made.

Further, the spans of the flaring are sequentially reduced from the open end to the bottom.

The technical scheme in the present disclosure has the advantage that the smooth bending from the flaring end to the bottom is more beneficial to guiding deformation.

Further, the shape of the cross section of the mold core is the same as or similar to that of the cross section of the mold cavity.

The technical scheme in the present disclosure has the advantage that the outer contour line of the cross section of the mold core and the outer contour line of the cross section of the mold cavity are same or similar, and the deformation supporting effect is achieved from the inner side, so that the wall thickness of the deformed tube billet can be guaranteed.

Further, when the mold core and the mold cavity are coaxial, the outer contour line of the cross section of the mold core and the contour line of the cross section of the mold cavity are equidistant lines.

The axis is positioned on the parting line after the upper mold and the lower mold are closed; and the axis is also coaxial with the axis of the tube billet, typically taking the axis of the tube billet as the axis of the mold core.

Further, the cross section of the upper mold cavity comprises an upper side arc section and an upper bottom arc section, and the radius of the upper bottom arc section is larger than that of the upper side arc section.

Further, the chord A of the upper bottom arc section is parallel to an axis-cross chord, and the distance between the chord A and the axis-cross chord is larger than ¼ of the chord length of the axis-cross chord.

Further, the initial distance between the contact surfaces of the upper mold and the lower mold is smaller than the distance between the chord A and the axis-cross chord.

Further, the cross section of the lower mold cavity comprises a lower side arc section and a lower bottom arc section, and the radius of the lower bottom arc section is larger than that of the lower side arc section.

Further, the upper mold and/or the lower mold comprise/comprises a side arc extrusion mold for extruding the upper side arc section and a bottom arc extrusion mold for extruding the bottom arc section.

On the basis of the scheme, in order to preferably perform the function of the mould, the using method of the mould described above is proposed, comprising the following steps:

step one, selecting an initial tube billet; the cross section of the initial tube billet can be circular, and the wall thickness of the initial tube billet is t;

step two, designing the upper mold, the lower mold and the mold core; in order to facilitate to take the mold core out of the tube billet, the outer contour of the mold core is deviated inwards by a distance of t+a compared with the inner surfaces of the upper mold and the lower mold, and a is larger than 0.05 mm and smaller than 10 mm;

step three, placing the initial tube billet in the lower mold cavity of the lower mold, inserting the mold core into a compression position in the initial tube billet, and pressing the upper mold downwards to achieve mold assembly, so that the circumference of the initial tube billet is partially shortened; and step four, opening the mold, and taking out the mold core to obtain a finished tube fitting.

Further, according to the method for designing the upper mold, the lower mold and the mold core, an inner molded surface formed after the upper mold cavity of the upper mold is combined with the lower mold cavity of the lower mold is the same as or similar to the shape contour of the cross section of the shortened circumference part of the finished tube fitting; the axis-cross chord of the cross section of the mold core is overlapped with a parting line of the upper mold and the lower mold; the chord A of the molded surface of the mold core on the cross section is parallel to the axis-cross chord, and the distance between the chord A and the axis-cross chord is larger than ¼ of the chord length of the axis-cross chord; and the initial distance between the contact surfaces of the upper mold and the lower mold is smaller than the distance between the chord A and the axis-cross chord.

Reference signs in attached figures: 1, upper mold; 1.1, upper mold cavity; 1.11, upper bottom arc section; 1.12, upper side arc section; 2, lower mold; 2.1, lower mold cavity; 2.11, lower side arc section; 2.12, lower bottom arc section; 2.2, lower side arc extrusion mold; 2.3, lower bottom arc extrusion mold; 2, mold core; 3.2, chord A; 3.3, axis-cross chord; 3.4, molded surface; 4, product; 4a, initial tube billet; 6, side arc extrusion mold; and 7, bottom arc extrusion mold.

DETAILED DESCRIPTION OF THE EMBODIMENTS

The following embodiments, in conjunction with the attached figures, are intended only to illustrate the technical schemes recorded in claims and are not intended to limit the protection scope of the claims.

Embodiment I

Figure 1:
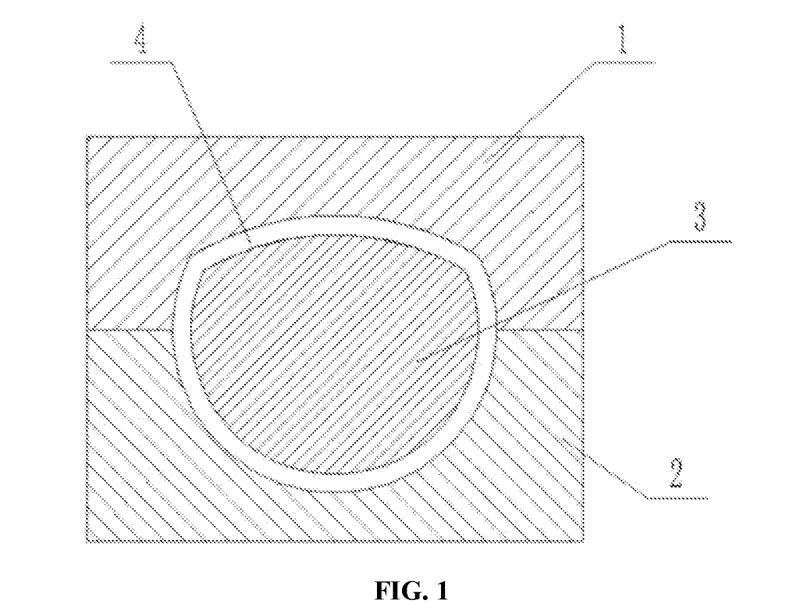
FIG. 1 is a schematic diagram of a mold assembly state of a mode for partially shortening the circumference of a tube billet in the present disclosure.
Figure 2:
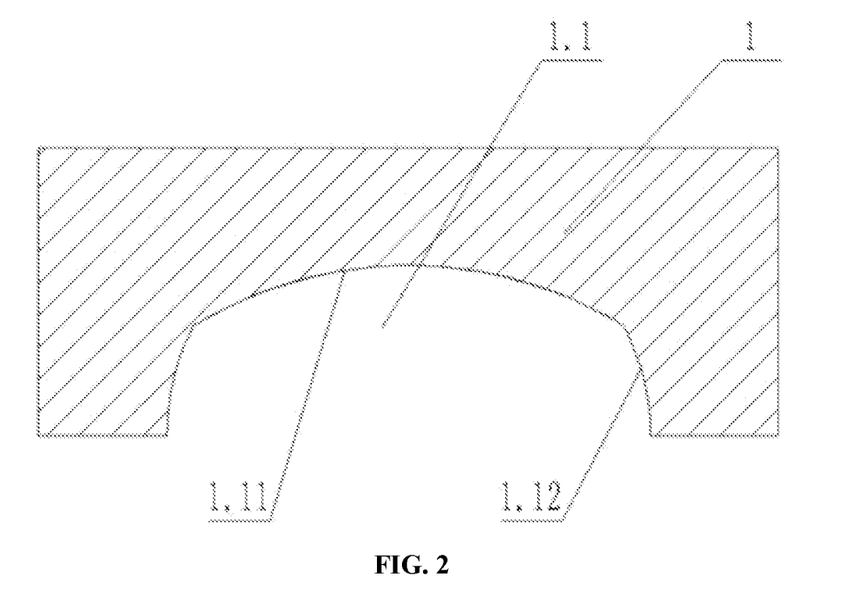
FIG. 2 is a structural schematic diagram of an upper mold.
Figure 3:
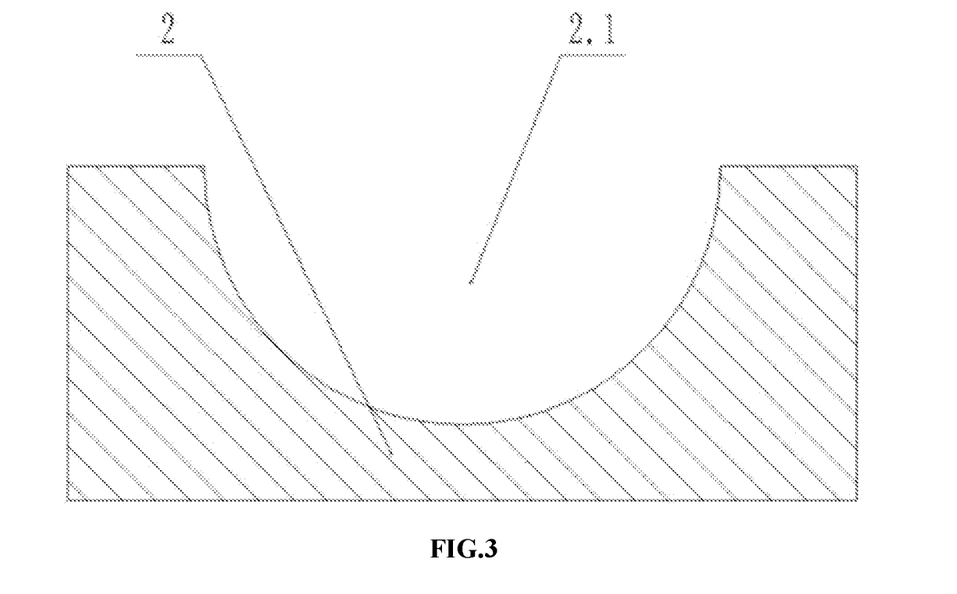
FIG. 3 is a structural schematic diagram of a lower mold.

Referring to FIG. 1 to FIG. 3, a mold for partially shortening the circumference of a tube billet comprises an upper mold 1, a lower mold 2 and a mold core 3 used for being inserted into a tube cavity of the tube billet; the upper mold 1 is provided with an upper mold cavity 1.1, the lower mold 2 is provided with a lower mold cavity 2.1, and the upper mold cavity 1.1 and the lower mold cavity 2.1 are matched to form a mold cavity; after the mold core 3 is placed in the mold cavity, a tube billet deformation cavity is formed in the mold cavity; and the upper mold cavity 1.1 and/or the lower mold cavity 2.1 are/is in the shape of a flaring, the two sides of the flaring are arc-shaped, and included angles are formed between the two sides of the flaring and the moving direction of a movable mold. The movable mold can be an upper mold or a lower mold, and is used for extrusion in the upper mold and the lower mold.

On the basis of the above technical scheme, the following improvements and optimizations can also be made to part of the structure.

The spans of the flaring are sequentially reduced from the open end to the bottom.

The shape of the cross section of the mold core 3 is the same as or similar to that of the cross section of the mold cavity.

When the mold core 3 and the mold cavity are coaxial, the outer contour line of the cross section of the mold core 3 and the contour line of the cross section of the mold cavity are equidistant lines.

Embodiment II

On the basis of the first embodiment, the structure of the mold is designed as follows.

Referring to FIG. 2, the cross section of the upper mold cavity 1.1 comprises an upper side arc section 1.12 and an upper bottom arc section 1.11, and the radius of the upper bottom arc section 1.11 is larger than that of the upper side arc section 1.12. The included angle between the chord of the upper side arc section 1.12 and the chord A of the upper bottom arc section 1.11 is 130° to 150°.

Figure 4:
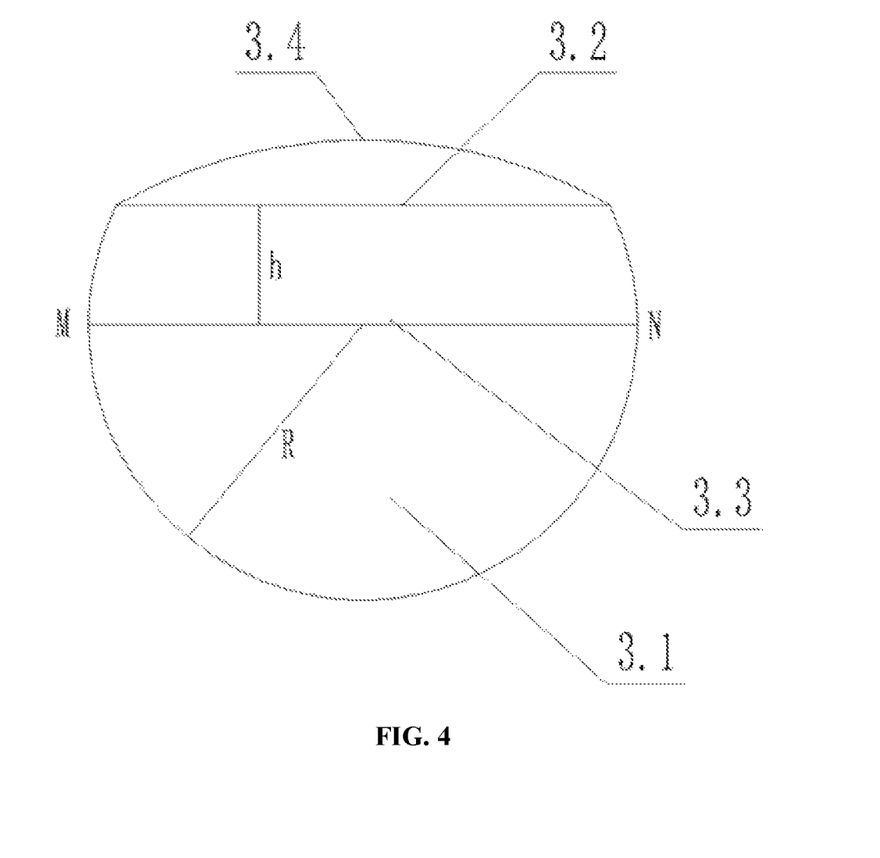
FIG. 4 is a structural schematic diagram of a mold cavity after mold assembly of the upper mold and the lower mold.

Referring to FIG. 2 and FIG. 4, the chord A 3.2 of the upper bottom arc section 1.11 is parallel to an axis-cross chord 3.3, and the distance between the chord A 3.2 and the axis-cross chord 3.3 is larger than ¼ of the chord length of the axis-cross chord 3.3.

Figure 8:
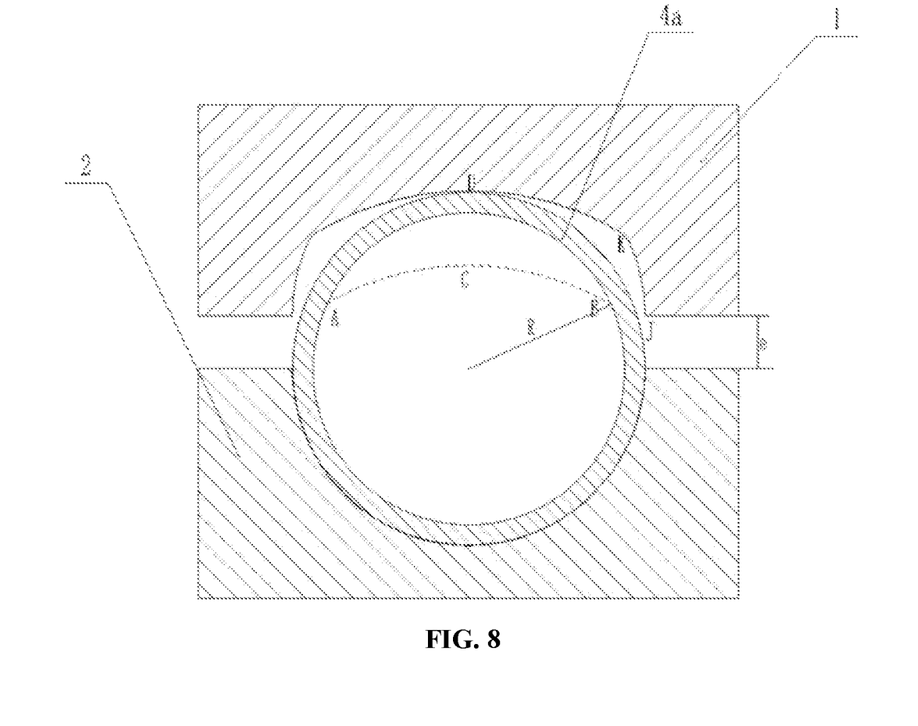
FIG. 8 is a position status schematic diagram that the upper mold is pressed downwards to be in contact with the top of the initial tube billet.

Referring to FIG. 8, the initial distance between the contact surfaces of the upper mold 1 and the lower mold 2 is smaller than the distance between the chord A 3.2 and the axis-cross chord 3.3.

Figure 9:
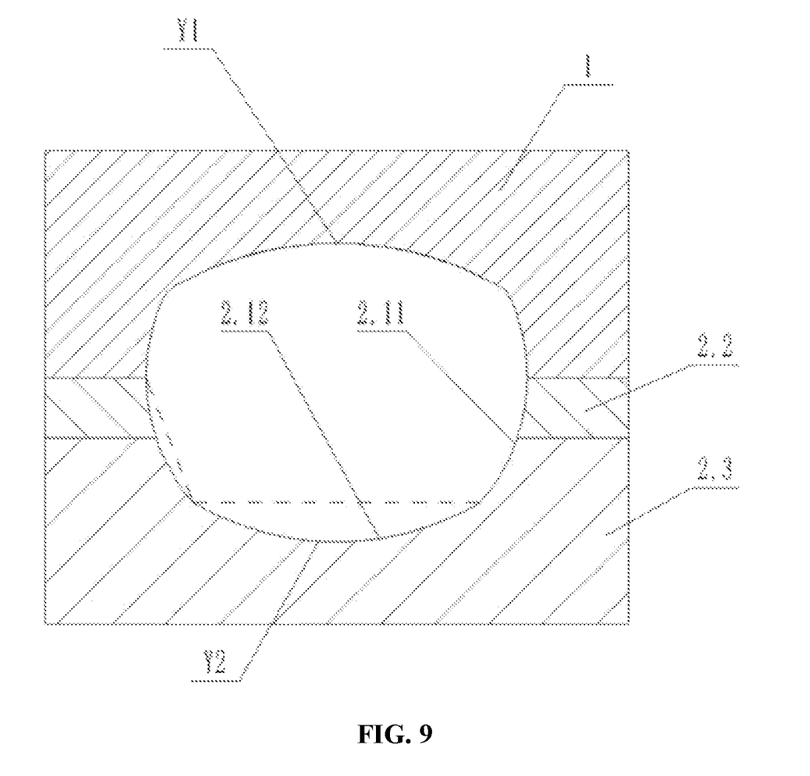
FIG. 9 is a structural schematic diagram that the initial tube billet needs the mold needing to be extruded on the upper and lower sides.

Referring to FIG. 9, the cross section of the lower mold cavity 2.1 comprises a lower side arc section 2.11 and a lower bottom arc section 2.12, and the radius of the lower bottom arc section 2.12 is larger than that of the lower side arc section 2.11.

Figure 10:
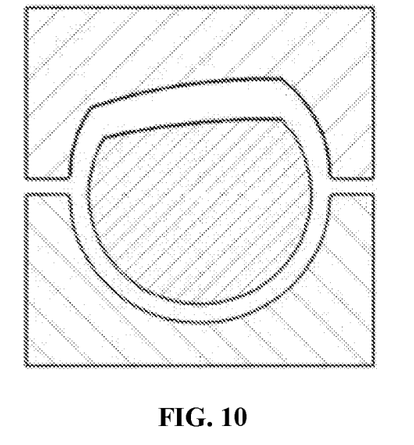
FIG. 10 is a structural schematic diagram of the mold that the chord A is not parallel to an axis-cross chord.
Figure 11:
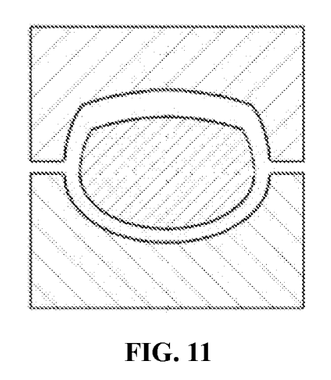
FIG. 11 is a structural schematic diagram of the mold that the mold cavity and the mold core are both non-circular sections.
Figure 12:
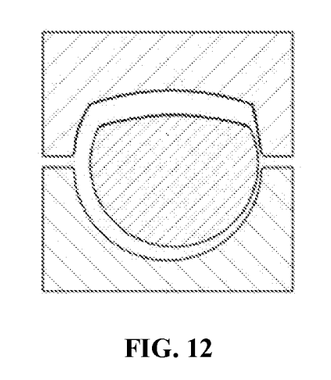
FIG. 12 is a structural schematic diagram of the mold that the mold cavity and the mold core are both asymmetric structures.

The positions of the chord A and the cross-axis chord may also be not parallel. As shown in FIG. 10, the cross section of the mold core or product may also be a non-circular cross section (as shown in FIG. 11) and an asymmetrical structure (as shown in FIG. 12). The mold in the present disclosure can be suitable for deformation compression of tube billets with different section shapes so as to change the partial circumferences of the tube billets.

Embodiment III

The upper mold 1 and/or the lower mold 2 comprise/comprises a side arc extrusion mold for extruding the upper side arc section and a bottom arc extrusion mold for extruding the bottom arc section.

Referring to FIG. 9, on the basis of the first embodiment or the second embodiment, in order to solve the problem that two sides of a circular tube need to be deformed, the lower mold 2 comprises a lower side arc extrusion mold 2.2 and a lower bottom arc extrusion mold 2.3; the lower side arc extrusion mold 2.2 is an annular sleeve mold; the cross section of the mold cavity of the lower mold 2.1 comprises a lower bottom arc section 2.12 and two lower side arc sections 2.11; the two lower side arc sections 2.11 are in mirror symmetry; and the included angle between the chord of the lower side arc section 2.11 and the chord of the lower bottom arc section 2.12 is 130° to 150°.

Figure 13:
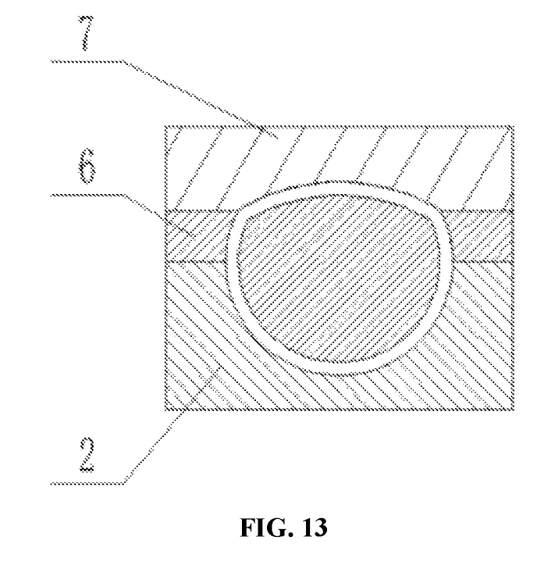
FIG. 13 is a structural schematic diagram of the mold that a side arc extrusion mold and a bottom arc extrusion mold are designed in parallel.
Figure 14:
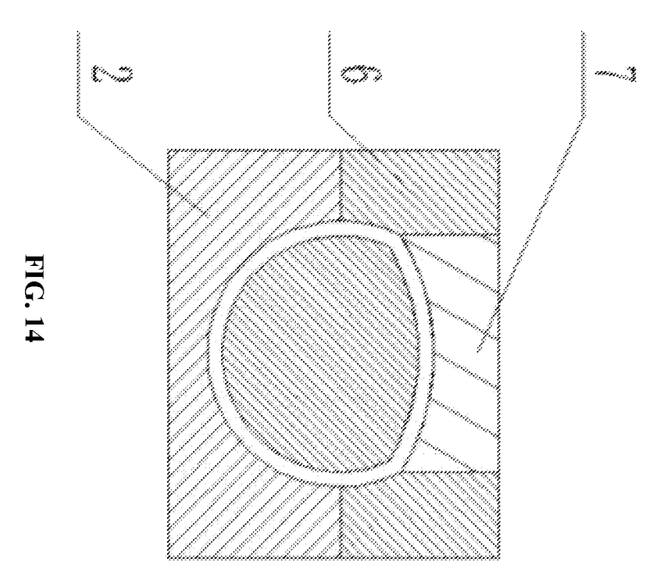
FIG. 14 is a structural schematic diagram of the mold that the side arc extrusion mold and the bottom arc extrusion mold are designed in a suit.

The upper mold and the lower mold can be both of split structures. The part used for extruding the side part of the tube billet and the part used for extruding the top part in the mold are separated to form the side arc extrusion mold 6 used for extruding the side part of the tube billet and the bottom arc extrusion mold 7 used for extruding the top part of the tube billet. The side arc extrusion mold 6 and the bottom arc extrusion mold 7 can be of parallel structures as shown in FIG. 13, and also can be of suit structures as shown in FIG. 14.

Embodiment IV

Figure 5:
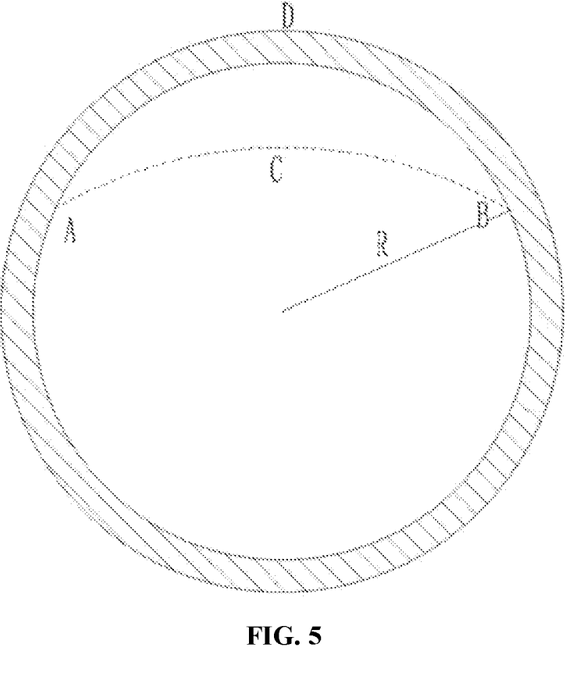
FIG. 5 is a cross-section schematic diagram of an initial tube billet.

In the actual production, in order to make the required deformation to the circular tube billet, for the design and the use of the mold, the following specific operating method is proposed, comprising the following steps:

step one, selecting an initial tube billet 4a (as shown in FIG. 5 and FIG. 8); the cross section of the initial tube billet 4a is preferably circular, and the wall thickness of the initial tube billet 4a is t;

step two, designing the upper mold 1, the lower mold 2 and the mold core 3; in order to facilitate to take the mold core 3 out of the tube billet, the outer contour of the mold core 3 is deviated inwards by a distance of t+a compared with the inner surfaces of the upper mold 1 and the lower mold 2, and a is larger than 0.05 mm and smaller than 10 mm;

step three, placing the initial tube billet 4a in the lower mold cavity 2.1 of the lower mold 2, inserting the mold core 3 into a compression position in the initial tube billet 4a, and pressing the upper mold 1 downwards to achieve mold assembly, so that the circumference of the initial tube billet is partially shortened; and step four, opening the mold, and taking out the mold core 3 to obtain a finished tube fitting 4.

Wherein, according to the method for designing the upper mold 1, the lower mold 2 and the mold core 2, referring to FIG. 2 and FIG. 3, an inner molded surface formed after the upper mold cavity 1.1 of the upper mold 1 is combined with the lower mold cavity 2.1 of the lower mold 2 is the same as or similar to the shape contour of the cross section of the shortened circumference part of the finished tube fitting; the axis-cross chord 3.3 of the cross section of the mold core 3 is overlapped with a parting line of the upper mold 1 and the lower mold 2, as shown in FIG. 1 and FIG. 4; the chord A 3.2 of the molded surface 3.4 of the mold core 3 on the cross section is parallel to the axis-cross chord 3.3, and the distance between the chord A 3.2 and the axis-cross chord 3.3 is larger than ¼ of the chord length of the axis-cross chord 3.3; the initial distance between the contact surfaces of the upper mold 1 and the lower mold 2 is smaller than the distance between the chord A 3.2 and the axis-cross chord 3.3; the cross section of the upper mold cavity 1.1 comprises an upper bottom arc section 2.12 and two upper side arc sections 2.11; the two upper side arc sections 2.11 are in mirror symmetry, and also can be asymmetrical; the opening width of the upper mold cavity 1.1 is equal to the diameter of the circular tube billet; and the included angle between the chord of the upper side arc section 1.12 and the chord of the upper bottom arc section 1.11 is 130° to 150°.

When required, the lower mold 2 can be designed as follows: referring to FIG. 9, the lower mold 2 comprises a lower side arc extrusion mold 2.2 and a lower bottom arc extrusion mold 2.3; the lower side arc extrusion mold 2.2 is an annular sleeve mold; the cross section of the mold cavity of the lower mold 2.1 comprises a lower bottom arc section 2.12 and two lower side arc sections 2.11; the two lower side arc sections 2.11 are in mirror symmetry; the included angle between the chord of the lower side arc section 2.11 and the chord of the lower bottom arc section 2.12 is 130° to 150°.

Embodiment V

Figure 6:
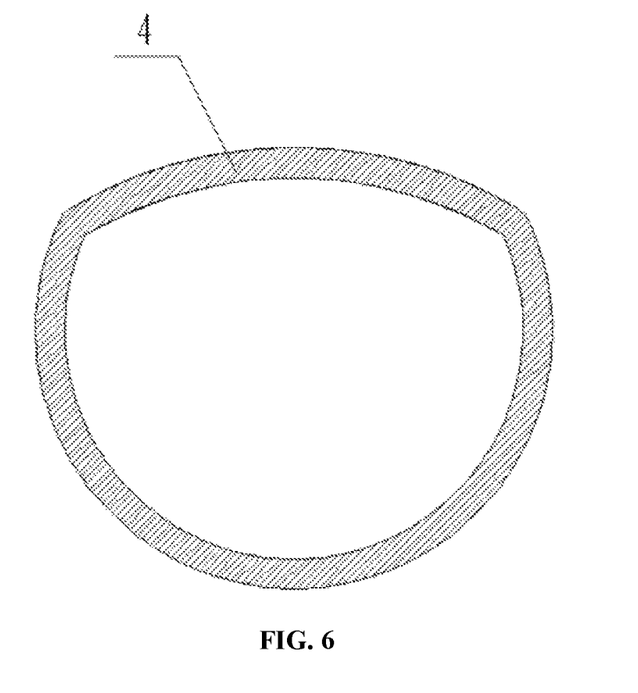
FIG. 6 is a structural schematic diagram of a finished tube fitting.

An initial tube billet 4a (as shown in FIG. 5 and FIG. 8) is taken, and the circumference of the initial tube billet 4a is planned to be partially compressed to form a tube fitting 4 (as shown in FIG. 6). The initial tube billet 4a has a circular cross-sectional shape, and the radius R is marked.

The mold is designed, wherein the inner molded surface after the upper mold 1 and the lower mold 2 are closed and the outer molded surface of the mold core 3 jointly form a spatial position where the tube billet is compressed. The shape of the inner molded surface of the upper mold 1 and the lower mold 2 and the shape of the outer molded surface of the mold core 3 are determined according to the following method.

Figure 7:
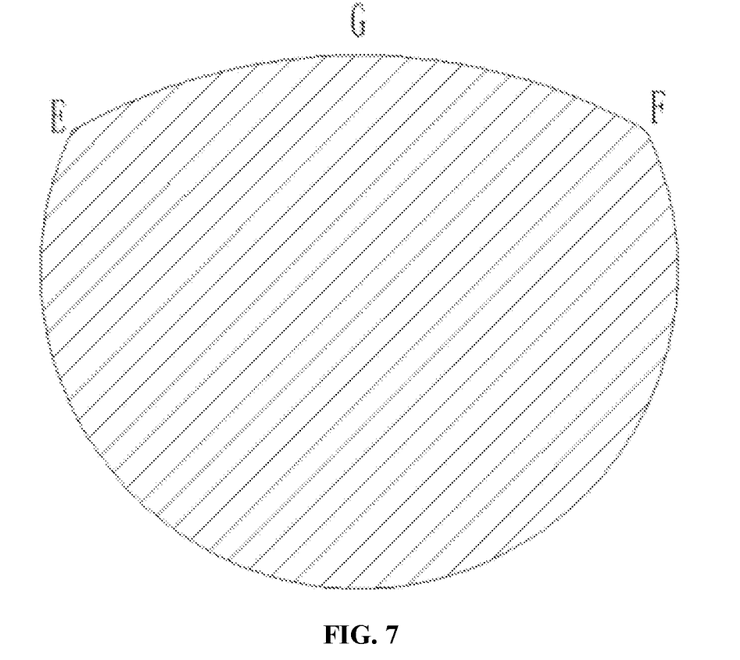
FIG. 7 is a profile structure schematic diagram of a mold core.

After the upper mold 1 and the lower mold 2 are closed, the shape of the contour formed by the inner molded surfaces of the upper mold 1 and the lower mold 2 is the same as that of the contour of the cross section of the tube fitting 4 (considering factors such as machining errors, the contours are similar to each other as long as the formed tube fitting 4 meets the tolerance requirement). A straight line MN3.3 (as shown in FIG. 3, the position is also the maximum cross-sectional straight line inside the cross section of the mold core, and the chord at the position of the straight line is also the diameter of the mold core) penetrating through the maximum cross section of the inner molded surface after the upper mold 1 and the lower mold 2 are closed is set as a parting line of the upper mold 1 and the lower mold 2. Preferably, MN3.3 is parallel to a chord A3.2, and the chord A3.2 passes through two endpoints of an arc ACB. The upper side part of the parting line is the inner molded surface of the upper mold 1, the lower side part of the parting line is the inner molded surface of the lower mold 2, and the cross section outer contour of the mold core 3 is obtained by inwards equidistantly doubling the wall thickness of the initial tube billet. Correspondingly, the molded surface EGF (FIG. 7) on the mold core 3 obtained by equidistantly doubling the wall thickness of the initial tube billet from the arc ACB is referred to as a compression platform-molded surface 3.4. The distance from the chord A 3.2 to the center is recorded as h, and it must be guaranteed that h is larger than 0.5 R.

The opening and the closing of the upper mold 1 and the lower mold 2 are generally defined as vertical mold opening and closing. The upper mold 1 is closed from top to bottom. When the upper mold 1 makes contact with the highest point D of the initial tube billet 4a (FIG. 4 and FIG. 8), due to the fact that h is larger than 0.5 R, the relation that e is smaller than h exists between the height e between mold parting faces of the upper mold 1 and the lower mold 2 and h. The practical significance is that the position of the parting surface of the upper mold 1 in the vertical direction is lower than the position of the molded surface 3.4 of the mold core 3 in the vertical direction, so that the inner molded surface of the upper mold 1 and the mold core 3 form a gap S with curvature, the gap S is slightly larger than the thickness of the tube billet. The smaller the e is, the narrower the gap S is. An included angle is formed between the bent gap and the movement direction of the mold. The bent gap can prevent the tube billet from flowing out along the gap when being compressed, so that the arc ACB is closed. The length and the size of the gap can be adjusted by adjusting the size relation between h and R, and h should generally be larger than 0.6 R.

As the upper mold 1 is pressed downwards, the height of the arc ACB is inevitably and continuously reduced. The arc ACB cannot flow out along the gap due to the constraint of the gap S and can only be gradually attached to the inner mold cavity of the upper mold 1 in the direction from the point J to the point K, friction force is formed between the arc ACB and the inner mold cavity after the arc ACB and the inner mold cavity are attached, and the material is further prevented from flowing out. As the compression force is increased, the arc ACB is pushed and pressed on the mold core 3. When the compression amount does not exceed 20 times of the initial wall thickness of the compressed tube billet, the arc ACB is finally compressed to be attached to the mold core 3 and does not wrinkle, and the purpose of shortening the arc length is achieved.

If two parts (such as the Y1 part and the Y2 part) of the tube billet need to be compressed, two sets of devices can be adopted for compressing respectively, and compression of two arc lengths can be completed in one working procedure at the same time through device design. As shown in FIG. 9, multiple parts of the tube billet can be compressed in the same way.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A mold for partially shortening the circumference of a tube billet, comprising an upper mold, a lower mold and a mold core used for being inserted into a tube cavity of the tube billet, the upper mold being provided with an upper mold cavity, the lower mold being provided with a lower mold cavity, and the upper mold cavity and the lower mold cavity being matched to form a mold cavity, wherein after the mold core is placed in the mold cavity, a tube billet deformation cavity is formed in the mold cavity, and an outer contour of the mold core is configured to be deviated inwards by a distance of t+a compared with inner surfaces of the upper mold and the lower mold, wherein t is the wall thickness of an initial tube billet that is selected and a is larger than 0.05 mm and smaller than 10 mm; and the upper mold cavity and/or the lower mold cavity are/is in the shape of a flaring, the two sides of the flaring are arc-shaped, and included angles are formed between the two sides of the flaring and the moving direction of the upper mold and/or lower mold.

2. The mold for partially shortening the circumference of a tube billet according to claim 1, wherein the spans of the flaring are sequentially reduced from the open end to the bottom.

3. The mold for partially shortening the circumference of a tube billet according to claim 1, wherein when the mold core and the mold cavity are coaxial, the outer contour line of the cross section of the mold core and the contour line of the cross section of the mold cavity are equidistant lines.

4. The mold for partially shortening the circumference of a tube billet according to claim 1, wherein the cross section of the upper mold cavity comprises an upper side arc section and an upper bottom arc section, and the radius of the upper bottom arc section is larger than that of the upper side arc section.

5. The mold for partially shortening the circumference of a tube billet according to claim 4, wherein the chord A of the upper bottom arc section is parallel to an axis-cross chord, and the distance between the chord A and the axis-cross chord is larger than ¼ of the chord length of the axis-cross chord.

6. The mold for partially shortening the circumference of a tube billet according to claim 5, wherein the initial distance between the contact surfaces of the upper mold and the lower mold is smaller than the distance between the chord A and the axis-cross chord.

7. The mold for partially shortening the circumference of a tube billet according to claim 1, wherein the cross section of the lower mold cavity comprises a lower side arc section and a lower bottom arc section, and the radius of the lower bottom arc section is larger than that of the lower side arc section.

8. The mold for partially shortening the circumference of a tube billet according to claim 1, wherein the upper mold and/or the lower mold comprise/comprises a side arc extrusion mold for extruding the upper side arc section and a bottom arc extrusion mold for extruding the bottom arc section.

9. A using method of the mold for partially shortening the circumference of a tube billet according to claim 1, comprising the following steps:

step one, selecting the initial tube billet;

step two, designing the upper mold, the lower mold and the mold core; in order to facilitate to take the mold core out of the tube billet;

step three, placing the initial tube billet in the lower mold cavity of the lower mold, inserting the mold core into a compression position in the initial tube billet, and pressing the upper mold downwards to achieve mold assembly, so that the circumference of the initial tube billet is partially shortened; and step four, opening the mold, and taking out the mold core to obtain a finished tube fitting.

10. The using method of the mold for partially shortening the circumference of a tube billet according to claim 9, wherein according to the method for designing the upper mold, the lower mold and the mold core, an inner molded surface formed after the upper mold cavity of the upper mold is combined with the lower mold cavity of the lower mold is the same as or similar to the shape contour of the cross section of the shortened circumference part of the finished tube fitting; the axis-cross chord of the cross section of the mold core is overlapped with a parting line of the upper mold and the lower mold; the chord A of the molded surface of the mold core on the cross section is parallel to the axis-cross chord, and the distance between the chord A and the axis-cross chord is larger than ¼ of the chord length of the axis-cross chord; and the initial distance between the contact surfaces of the upper mold and the lower mold is smaller than the distance between the chord A and the axis-cross chord.

11. The mold for partially shortening the circumference of a tube billet according to claim 2, wherein when the mold core and the mold cavity are coaxial, the outer contour line of the cross section of the mold core and the contour line of the cross section of the mold cavity are equidistant lines.

12. The mold for partially shortening the circumference of a tube billet according to claim 4, wherein the cross section of the lower mold cavity comprises a lower side arc section and a lower bottom arc section, and the radius of the lower bottom arc section is larger than that of the lower side arc section.

* * * * *